3,535,262
GAS GENERATION CARRIER
Theodore N. Hubbuch, Florence, James A. Murfree, Jr., and William A. Duncan, Huntsville, Billy J. Sandlin, Athens, and Henry A. Nappier, Laceys Spring, Ala., assignors to the United States of America as represented by the Secretary of the Army
No Drawing. Filed July 5, 1967, Ser. No. 651,655
Int. Cl. C01b 15/04
U.S. Cl. 252—186        8 Claims

ABSTRACT OF THE DISCLOSURE

The use of an inert porous bed such as freshly prepared alumina or silica gel as a support or carrier for an oxidizing agent which serves as an initiator for the decomposition of an exothermally decomposing monopropellant.

BACKGROUND OF THE INVENTION

This invention relates to a gas generation carrier and in particular to one which acts as a support for a liquid oxidizing agent in a propellant composition.

There is considerable interest in the rocket propulsion industry in the development and use of liquid monopropellant gas generators. Although the majority of work in this field has been in catalytic decomposition schemes, recent attention has been focused on schemes of gas generation utilizing a liquid monopropellant with an initiator and an inert porous carrier or support as more particularly disclosed in copending application Ser. No. 651,654, filed July 5, 1967. In these schemes, the monopropellant reacts with the initiator to start decomposition, generate heat, and heat the support which, when heated, thermally sustains the decomposition.

Accordingly, the principal object of this invention is to provide alumina or silica gel as a support or carrier in a gas generation scheme.

Another object of this invention is to provide an inert porous support or carrier that will absorb an oxidizing agent.

SUMMARY OF THE INVENTION

In accordance with this invention, it has been discovered that freshly prepared alumina or silica gel may be used as a support for an oxidizing agent such as potassium permanganate or calcium permanganate to serve as an initiator for the decomposition of an exothermally decomposing monopropellant.

DESCRIPTION OF THE PREFERRED EMBODIMENTS

Freshly prepared alumina or silica gel, when filtered and then suspended in a calcium permanganate or potassium permanganate solution, and subsequently filtered and dried, yields a mass which may be used to decompose an exothermally decomposing monopropellant.

In accordance with this invention, aluminum, dissolved in 1 N sodium hydroxide, and then acidified with dilute (3 N) hydrochloric acid, precipitated as a white solid, then allowed to adsorb an oxidizing agent such as potassium permanganate from another solution when contacted therewith, filtered and then dried, forms a mass which will decompose exothermally decomposing monopropellants such as hydrazine.

Similarly, sodium silicate solution may be acidified, precipitated and then allowed to adsorb an oxidizing agent such as potassium permanganate by contacting the freshly prepared silica gel with the potassium permanganate. Of course, mixtures of the aluminum and sodium silicate precipitates may also be employed.

The alumina and/or silica (which are the products after drying) form a refractory mass to hold heat for subsequent thermal decomposition of the monopropellant. Additionally, the alumina and/or silica serve as a carrier or support for the oxidizing agent which serves as the initiator for the monopropellant decomposition. When the monopropellant is allowed to come into contact with the support and oxidizing agent, a reaction between the oxidizing agent and monopropellant occurs with the liberation of sufficient heat to raise the temperature of the support such that the monopropellant will spontaneously and exothermally decompose with gas generation after the oxidizing agent or initiator has been consumed.

The preferred monopropellant is hydrazine. Note that certain initiators will not work with certain other monopropellants. However, the monopropellant may be any exothermally decomposing type so that when decomposed, it liberates heat which raises the temperature of the carrier or support such that the exothermic decomposition of the monopropellant is maintained thermally. All that is required is that the initiator used be compatible with the particular monopropellant chosen.

An initiator which has been satisfactorily used in place of potassium permanganate is calcium permanganate. Various other initiators may also be employed.

Various modifications and variations of this invention will be readily apparent to those skilled in the art in the light of the above teachings which are within the spirit and scope of this invention.

What is claimed is:
1. The process of loading an inert support material for a gas generator comprising: providing an inert support material comprising freshly prepared alumina gel or silica gel that have been prepared by acidifying a solution of aluminum dissolved in an alkali metal hydroxide or a solution of sodium silicate and then precipitating; and, supporting a permanganate oxidizing agent in said support material by adsorbing said oxidizing agent onto said support material from a solution of said oxidizing agent.
2. The process of claim 1 wherein said inert support material is freshly prepared silica gel.
3. The process of claim 1 wherein said inert support material is freshly prepared alumina.
4. The process of claim 1 wherein said oxidizing agent is calcium permanganate.
5. The process of claim 1 wherein said oxidizing agent is potassium permanganate.
6. The process of claim 1 wherein said inert support material is allowed to adsorb said oxidizing agent by bringing said oxidizing agent into contact with said support material.
7. The process of claim 6 wherein said inert support material is freshly prepared alumina and said alumina is dissolved in sodium hydroxide before being acidified.
8. The process of claim 6 wherein said inert support material is freshly prepared silica gel and said oxidizing agent is potassium permanganate.

References Cited

UNITED STATES PATENTS

| | | | |
|---|---|---|---|
| 3,155,627 | 11/1964 | Cole et al. | 252—454 X |
| 3,161,605 | 12/1964 | Beck et al. | 252—454 X |
| 3,328,316 | 6/1967 | Mulaskey | 252—454 X |
| 3,344,086 | 9/1967 | Cramer et al. | 252—452 |

CARL D. QUARFORTH, Primary Examiner
F. M. GITTES, Assistant Examiner

U.S. Cl. X.R.
252—451, 454